United States Patent
Wright

(10) Patent No.: US 8,325,782 B1
(45) Date of Patent: Dec. 4, 2012

(54) METHOD AND APPARATUS FOR USING EMPTY TIME SLOTS FOR SPREAD SPECTRUM ENCODING

(75) Inventor: David Wright, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 641 days.

(21) Appl. No.: 12/403,929

(22) Filed: Mar. 13, 2009

Related U.S. Application Data

(63) Continuation of application No. 11/006,934, filed on Dec. 7, 2004, now Pat. No. 7,519,101.

(60) Provisional application No. 60/531,442, filed on Dec. 18, 2003.

(51) Int. Cl.
*H04B 1/00* (2006.01)

(52) U.S. Cl. ........ 375/140; 375/130; 375/141; 375/145; 375/146; 375/295

(58) Field of Classification Search .................. 375/130, 375/131, 132, 135–136, 140, 145–147, 150, 375/259, 260, 299, 306, 316, 322, 342, 343, 375/350, 367
See application file for complete search history.

(56) References Cited

U.S. PATENT DOCUMENTS

| | | | |
|---|---|---|---|
| 5,136,614 A | 8/1992 | Hiramatsu et al. | |
| 5,216,693 A | 6/1993 | Nakamura | |
| 6,035,177 A | 3/2000 | Moses et al. | |
| 6,061,342 A | 5/2000 | Tsubouchi et al. | |
| 6,115,411 A | 9/2000 | Van Driest | |
| 6,115,609 A | 9/2000 | Kim et al. | |
| 6,223,053 B1 * | 4/2001 | Friedmann et al. | 455/552.1 |
| 6,317,422 B1 * | 11/2001 | Khaleghi et al. | 370/342 |
| 6,487,238 B1 | 11/2002 | Kamo | |
| 6,727,790 B2 | 4/2004 | Raphaeli et al. | |
| 6,772,065 B2 * | 8/2004 | Sanmiya et al. | 701/469 |
| 6,970,496 B1 * | 11/2005 | Ben-Bassat et al. | 375/141 |
| 7,092,372 B1 | 8/2006 | Jensen et al. | |
| 7,336,722 B2 * | 2/2008 | Lundby et al. | 375/295 |
| 7,920,620 B1 * | 4/2011 | McConnell | 375/149 |
| 2002/0006156 A1 * | 1/2002 | Belaiche | 375/130 |
| 2004/0120424 A1 | 6/2004 | Roberts | |
| 2004/0141525 A1 | 7/2004 | Bhushan et al. | |
| 2004/0202229 A1 | 10/2004 | Raphaeli et al. | |
| 2004/0258131 A1 | 12/2004 | Margon | |
| 2006/0036353 A1 * | 2/2006 | Wintermantel | 700/300 |
| 2006/0166681 A1 * | 7/2006 | Lohbihler | 455/456.2 |

OTHER PUBLICATIONS

U.S. Appl. No. 11/006,934, "Method and Apparatus for Using Empty Time Slots for Spread Spectrum Encoding," David Wright, filed Dec. 7, 2004; 24 pages.
U.S. Appl. No. 60/531,432, filed Dec. 18, 2003; 12 pages.
USPTO Non-Final Rejection for U.S. Appl. No. 11/006,934, dated Apr. 16, 2008; 16 pages.
USPTO Non-Final Rejection for U.S. Appl. No. 11/006,934, dated Oct. 30, 2007; 10 pages.
USPTO Notice of Allowance for U.S. Appl. No. 11/006,934, dated Nov. 28, 2008; 5 pages.

\* cited by examiner

*Primary Examiner* — Hirdepal Singh

(57) ABSTRACT

Communication circuitry uses a combination of Pseudo-Noise (PN) coded and non-PN coded transmission periods to represent different data values. In one embodiment, a number of data values are encoded into a smaller second number of encoded ternary values. The Pseudo-Noise (PN) codes are transmitted representing some of the encoded ternary values and no transmitted PN codes represent other encoded ternary values. The throughput of spread spectrum radio systems is increased by representing data values in fewer spread spectrum time slots.

15 Claims, 5 Drawing Sheets

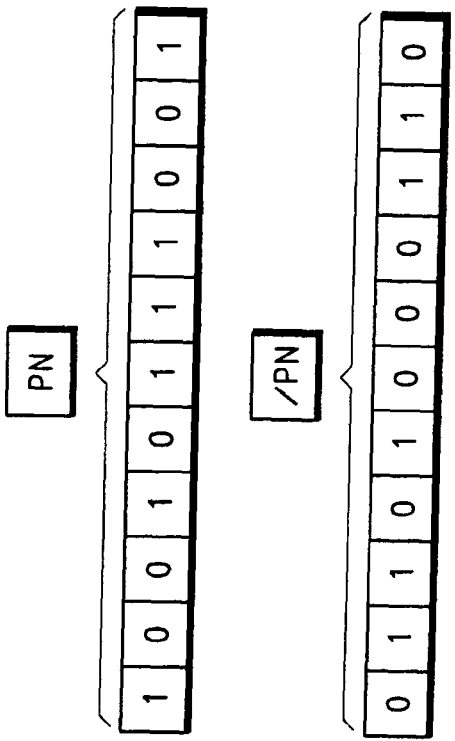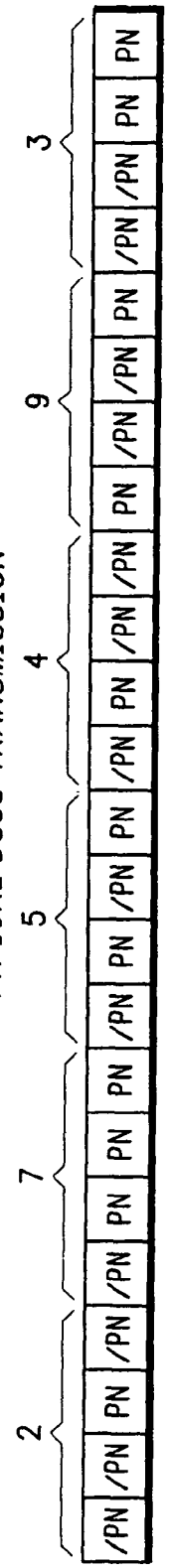

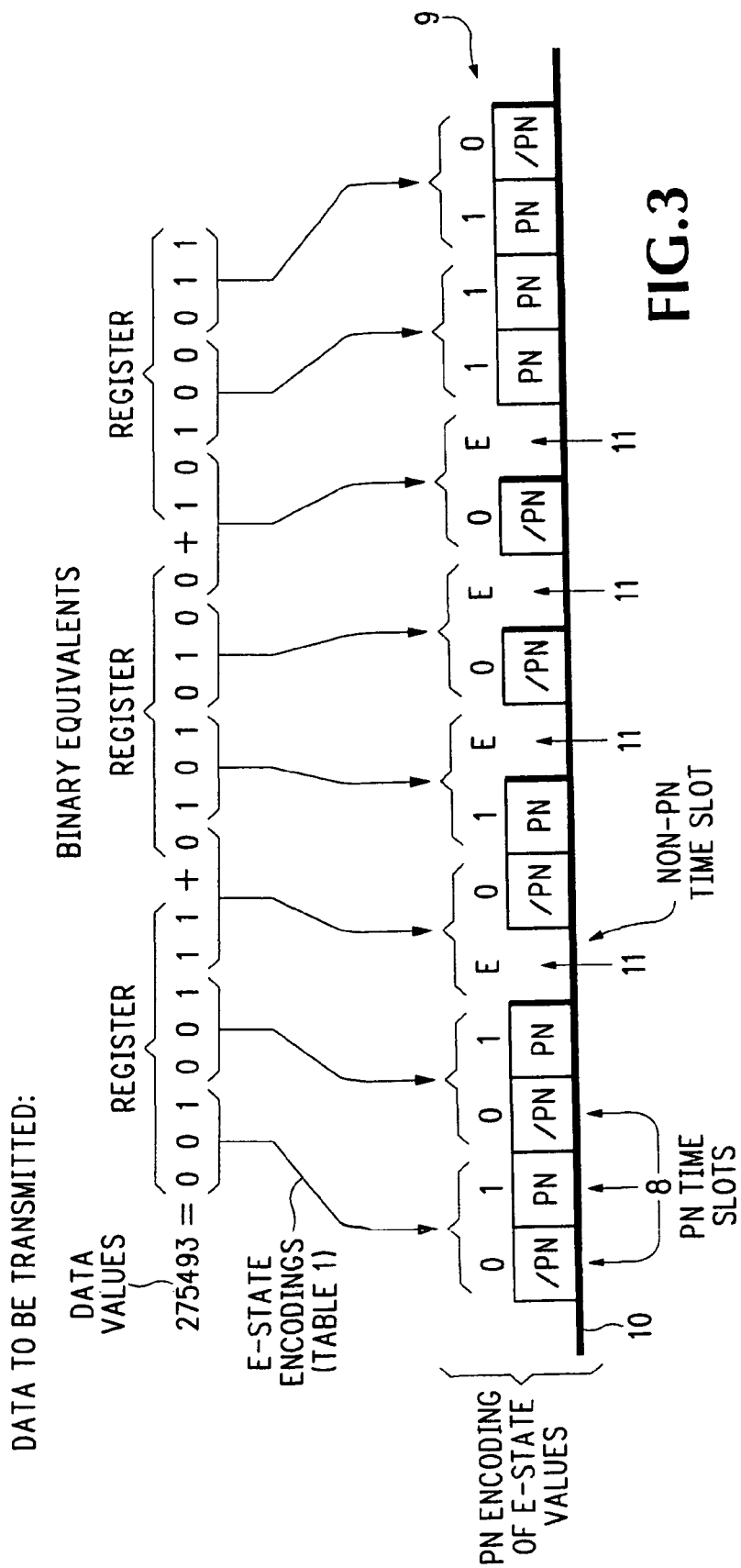

METHOD AND APPARATUS FOR USING EMPTY TIME SLOTS FOR SPREAD SPECTRUM ENCODING

This application is a continuation of U.S. pending application Ser. No. 11/006,934, filed Dec. 7, 2004, the entire disclosure of which is incorporated herein by reference.

This application claims priority from U.S. Provisional Application Ser. No. 60/531,442, filed Dec. 18, 2003.

TECHNICAL FIELD

The present invention relates generally to electronic circuits and in particular to wireless communication circuits.

BACKGROUND OF THE INVENTION

Direct Sequence Spread Spectrum (DSSS) is an encoding technique used in wireless communications systems. DSSS wireless systems typically transmit data by encoding "1"s and "0"s as different Pseudo-Noise (PN) codes. An exemplary DSSS encoding scheme is shown in FIG. 1. The PN codes corresponding to a '1' value and a '00' value are shown and are complimentary. Several different DSSS demodulation techniques are used today. In one exemplary demodulation technique, the received signal is decoded by passing it through a digital correlator which converts the received pseudo-noise signal back into data bits.

The DSSS systems exhibit longer range and better interference immunity than conventional Frequency Shift Key (FSK) radio systems because the correlator allows correct decoding of corrupted PN code portions. However, these advantages come at the expense of reduced throughput, as the data rate is equal to the length of the PN code and is only a fraction of the raw modulation frequency.

In one example, a transceiver device encodes transmit data as either 32 or 64 "chip" PN codes. One chip is one data element transmitted at the raw modulation frequency of the radio. In most DSSS radios, a data "1" bit is transmitted as the PN code and a data "0" bit is transmitted as the inverse of that same PN code. The receiver comprises a digital correlator that decodes a high correlation (i.e. where most of the chips match) as a "1" value and decodes a low correlation (i.e. where most of the chips do not match) as a "0" value.

FIG. 2 shows an exemplary transmitted DSSS encoding. Firmware running on a microcontroller (MCU) coupled with a radio sends an 24-byte data packet 0x275493 by loading 0b00100111 into a Transmit (TX) data register and 0b11111111 into a data valid register, followed by 01010100 and 0b11111111, and then 0b10010011 and 0b11111111, respectively. This transmission takes 24 bit periods. The data valid register is used to gate transmission of the data in the TX data register, and these bits have a 1-1 correspondence.

Decoding may be configured so that when using 64-chip PN codes a correlation of 56 or more chips within the 64 bit code is decoded as a "1" and a correlation of 8 or fewer chips is decoded as a "0". If the correlation result is between 9 and 55 no data is decoded. Interference or a high signal-noise ratio may prevent some bits in a packet from being decoded. This is called an 'erasure'. When no data is being transmitted, generally no data will be decoded. Although, random noise may cause occasional spurious correlations.

Data is transmitted in packets in some wireless systems and the end of a packet is typically detected after three successive non-correlations. In other words, an end of packet is detected when no 1 or 0 value is successfully decoded for three successive correlation periods. Conventional DSSS systems can therefore detect 3 states, "1", "0" and "E" (erasure).

As mentioned above, one disadvantage of conventional DSSS radio systems is that the throughput/bit-rate is significantly less than the raw modulation frequency. It would be desirable to increase data throughput for spread spectrum systems.

SUMMARY OF THE INVENTION

Communication circuitry uses a combination of Pseudo-Noise (PN) coded and non-PN coded transmission periods to represent different data values. In one embodiment, a number of data values are encoded into a smaller second number of encoded ternary values. The Pseudo-Noise (PN) codes are transmitted representing some of the encoded ternary values and no transmitted PN codes represent other encoded ternary values. The throughput of spread spectrum radio systems is increased by representing data values in fewer spread spectrum time slots.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 shows operation of a conventional Direct Sequence Spread Spectrum (DSSS) scheme.

FIG. 2 shows a data transmission using the conventional DSSS scheme.

FIG. 3 shows DSSS (empty state) encoding that uses empty Pseudo Noise (PN) time slots to represent an additional data value.

DETAILED DESCRIPTION

Figure 4:
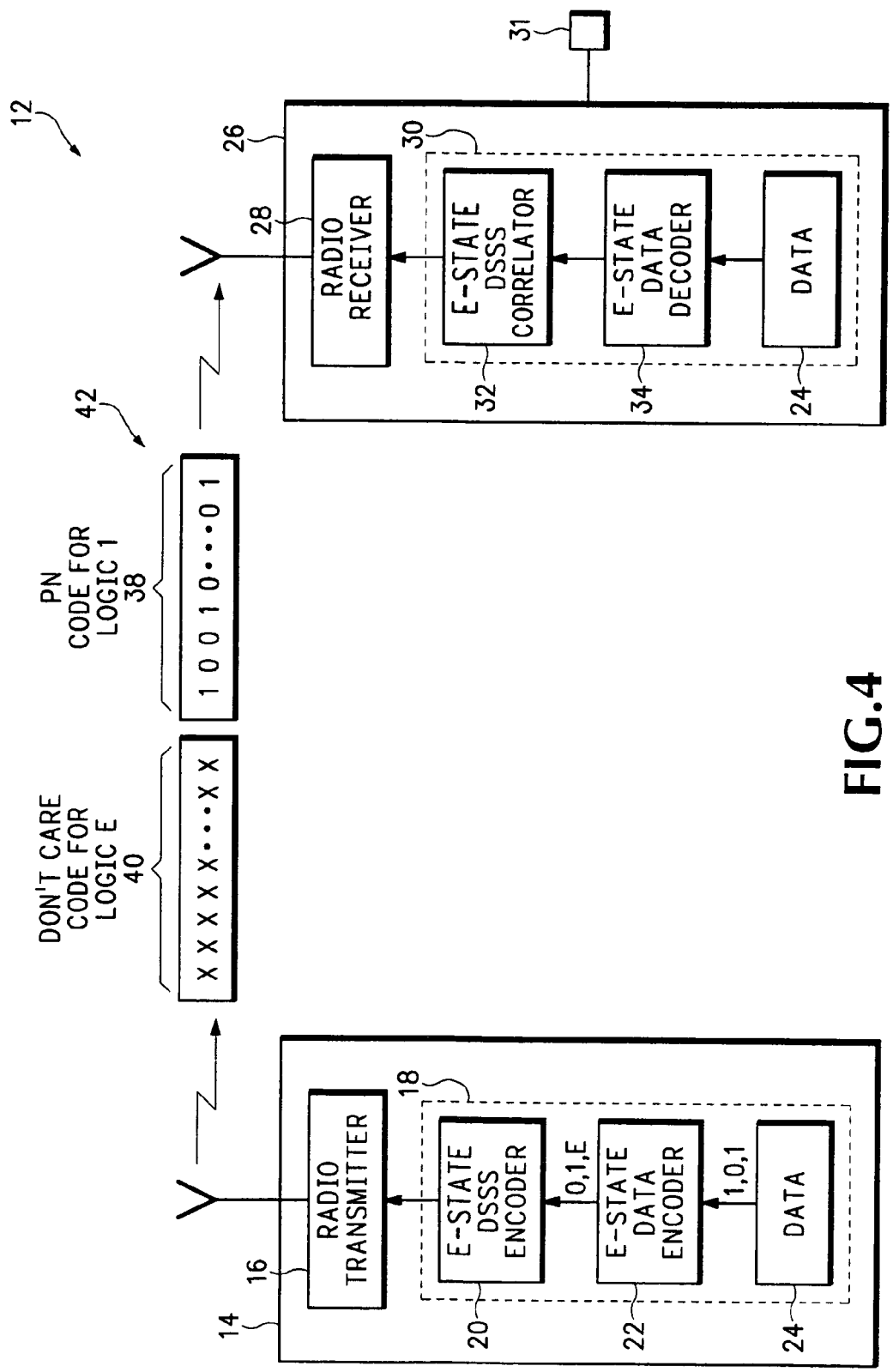
FIG. 4 is a block diagram of a wireless communication system that uses the spread spectrum empty state encoding shown in FIG. 3.

FIG. 3 describes an encoding scheme that uses an erasure ("E") state, in addition to logic "1" and logic "0" states when encoding Direct Sequence Spread Spectrum (DSSS) data. The E-state is also referred to below as an empty state or a "don't care" state. The E-state encoding scheme can be implemented in any DSSS radio system or component where an integer number of bit periods of non-transmission are used for carrying data. Non-transmission refers to any Pseudo Noise (PN) time slot that is not used for transmitting a conventional PN code. The term "Non-transmission" is intended to also include transmission of an un-modulated carrier, transmission of only a pre-amble used to help a receiver lock to a transmitted signal.

Table 1 shows one example implementation of the empty state (E-state) encoding. The left hand column shows three bit binary data values. The right hand column shows the E-state ternary values corresponding to the binary value in the left hand column. The term ternary refers to a data element that can have three different values. Each E-state encoded digit can have one of three different values including a logic '1' value, a logic '0' value, or a logic 'E' value. Since each digit can have three different values, a three digit binary value can be represented using only two E-state digits.

TABLE 1

Exemplary mapping of data using E-State encoding scheme.

| Binary Data | E-State Encoding |
|---|---|
| 000 | 00 |
| 001 | 01 |
| 010 | 0E |
| 011 | 1O |
| 100 | 11 |
| 101 | 1E |
| 110 | E0 |
| 111 | E1 |

Referring to FIG. 3, the logic 1 and logic 0 values for the E-state values in the right-hand column of Table 1 are encoded and decoded using conventional PN codes. For example, a logic 1 value may be encoded using a particular 32 or 64 bit PN code and a logic 0 value is encoded as the inverse of the same PN code (/PN). However, the logic E values are not encoded with any PN code. As a result, the receiver will not correlate any PN code with the E-values.

FIG. 3 shows a sequence of data values '275493' that are transmitted using the E-state encoding scheme. The four bit binary equivalent for each individual data value is shown to the right of the data values 275493. The binary values in this example are stored or processed in groups of eight bits. Of course the bits can be stored or processed in any bit size, but are shown in eight bit segments for illustrative purposes.

Table 1 is used to convert groups of three binary bits into two ternary values. For example, using table 1, the first three binary bits '001' are encoded into the E-state value '01'. The second group of three binary bits '001' are also encoded into the E-state value '01'. The next group of three binary bit values '110' is encoded into the E-state value 'E0' and the next group of three binary bit values '101' are converted into the E-state value 'E'.

The same encoding process is continued until all of the binary data values are encoded into E-state values 9. In a second encoding stage, the E-state encoded data 9 is encoded into PN codes and non-PN codes according to the corresponding E-state values. For example, the logic 1 values in the E-state encoded data 9 is encoded by a PN code and the logic 0 values in the E-state encoded data 9 is encoded as an inverse PN code (/PN). This PN and /PN encoding is similar to the encoding that is normally performed in spread spectrum transmissions. However, any E values in the E-state encoded data 9 are not encoded as any PN code. Instead, no PN signaling is transmitted at all, or some non-PN code signal is transmitted, such as DSSS header data. This is shown in spread spectrum signal 10 of FIG. 3 where time slots 11 are not transmitted with any PN codes corresponding with the E values.

The result of the E-state encoding is that two E-state spread spectrum values can be used to represent three binary spread spectrum values. Or in other words, only two time slots 8 in spread spectrum signal 10 are required to transfer the same information that conventionally required three spread spectrum time slots 8. This can be seen by comparing the spread spectrum signal in FIG. 2 with the spread spectrum signal 10 in FIG. 3. The same data sequence '275493' is transmitted in each figure. The conventional spread spectrum encoding in FIG. 2 requires 24 PN time slots. However, in FIG. 3 the same data sequence is transmitted in a spread spectrum signal using only 16 PN and non-PN time slots 8 and 11.

In one implementation, no more then two E values are allowed to be encoded back to back. This prevents data packets from being transmitted that include three or more successive E values. For example, the state "EEE" is not allowed. This prevents decoding systems from interpreting multiple E-states as an end of packet or as the beginning or end of some other framing/synchronization condition. The number of back to back E values can be varied according to the specific communication system configuration.

Alternative E-State Encodings

In an alternative encoding embodiment, the DSSS system may use more than two PN codes to encode data. In one example, a wireless system using the E-state encoding scheme may have a Dual Data Rate (DDR) mode where two 32-chip PN codes and their inverses (i.e. 4 PN codes) are used in the spread spectrum transmissions. In this embodiment, two data bits may be included in a single 32-chip transmission period. This is shown in table 2.

TABLE 2

Exemplary mapping of data using alternate DSSS scheme.

| Data to be carried | E-State Encoding |
|---|---|
| 00 | PN code A ("A") |
| 01 | inverse of—PN code A ("/A") |
| 10 | PN code B ("B") |
| 11 | inverse of PN code B ("/B") |

The E-state encoding can also be used in this alternative multi-PN code DSSS scheme. In this DSSS scheme, any time slot can represent one of five possible data values—A, /A, B, /B or E. In any four bit time slot period, there are therefore 625 possible combinations. Eliminating the combinations which would require three or more successive non-transmissions, leaves slightly less combinations. This is still more than the 512 combinations possible using nine binary digits.

TABLE 3

| Data to be carried | E-State Encoding |
|---|---|
| 000000000 | 0000 |
| 000000001 | 0001 |
| 000000010 | 000E |
| 000000011 | 0010 |
| 000000100 | 00E0 |
| 000000101 | 001E |
| 000000110 | 00E1 |
| 000000111 | 00EE |
| etc. | etc. |

Table 3 shows a sample portion of the E-state encoding values that could be used to encode nine binary bits into four E-state values. In this alternate embodiment, nine bits of binary data is encoded for transmission in a four-bit PN time slot period. Each 18 bits to be transmitted would typically be encoded into eight data bits loaded into a Transmit (TX) data register and eight bits loaded into a data valid register. The DDR mode described above enables 16 bits to be transmitted in eight 32-chip PN code bit periods. Therefore, throughput is increased by 12.5% and the maximum available data throughput is increased from 62.5 thousand bits per second (kbps) to 70.3 kbps.

FIG. 4 shows one example of a wireless communication system 12 that provides E-state encoding and spread spectrum signaling. A transmitting device 14 transmits Direct Sequence Spread Spectrum (DSSS) wireless signals 42 and a receiving device 26 receives the DSSS wireless signals 42. A wireless link between the transmitting device 14 and the receiving device 26 carries the DSSS wireless signals 42 and a sequence of PN bit codes and non-PN codes carry information across the link as described above in FIG. 3.

The transmitting device 14 includes communication circuitry 18 and the receiving device 26 includes communication circuitry 30 that is configured to use a combination of PN codes and non-PN codes for transmitting data. The communication circuitry 18 and 30 may be programmable microprocessor units (MCUs), discrete logic, or a combination or both. A radio transmitter 16 is located in the transmitting device 14 and a radio receiver 28 is located in the receiving device 26. However, the transmitting device 14 and/or the receiving device 26 may include transceiver circuitry 16 or 28 that can both transmit and receiver spread spectrum signaling.

In one example, the radio transmitter device 14 is a Universal Serial Bus peripheral device and the radio transmitter device 26 operates as a wireless dongle that connects to a USB host computer (not shown). In this example, the receiving device 26 includes a USB cable 31 that connects into the USB host computer, such as a Personal Computer (PC). In another embodiment, the wireless receiving circuitry 26 may all be integrated inside the host computer. This is only one example, and the E-state encoding described above can be used in any wireless spread spectrum system.

Data 24 in the transmitting device 14 is any data that needs to be wirelessly transmitted to the receiving device 26. The data 24 can take any form and can include binary data, hexadecimal data, decimal data, etc. The data 24 may originate in the transmitting device 14 or can be received from another source and then sent to transmitting device 14 for wireless transmission to receiving device 26.

An E-state data encoder 22 encodes the data 24 into the E-state ternary data values as described above in tables 1 and 3. For example, groups of three binary data bits 24 are encoded by the E-state data encode 22 into groups of two E-state data values that have either a logic 1 value, a logic 0 value, or a third logic E value.

An E-state DSSS encoder 20 encodes the logic 1 and logic 0 values for the E-state encoded data into conventional PN codes. The PN encoded 1 and 0 logic values are then transmitted from radio transmitter 16 as a PN spread spectrum signal as represented by PN transmission 38. The E-state DSSS encoder 20 does not encode PN codes with the E logic values and instead disables radio transmitter 16 during the associated time period. Alternatively, the encoder 20 may not completely disable the radio transmitter 16, but instead may cause the transmitter 16 to transit some other signal that is not a PN code. This is represented in FIG. 4 by a transmission 40 that contains an "empty" or "don't care" non-PN code.

The receiving device 26 includes a radio receiver 28 that receives the PN encoded signals 38 and the non-PN encoded signals 40 in spread spectrum signaling 42. The communication circuitry 30 includes an E-state DSSS correlator 30 that identifies the PN encoded logic 1 and logic 0 values 38 and the non-PN encoded logic E values 40 in the spread spectrum signals 42. An E-state data decoder 34 then converts the logic 0, 1 and E values back into binary data 24 as shown above in tables 1 or 3.

Figure 5:
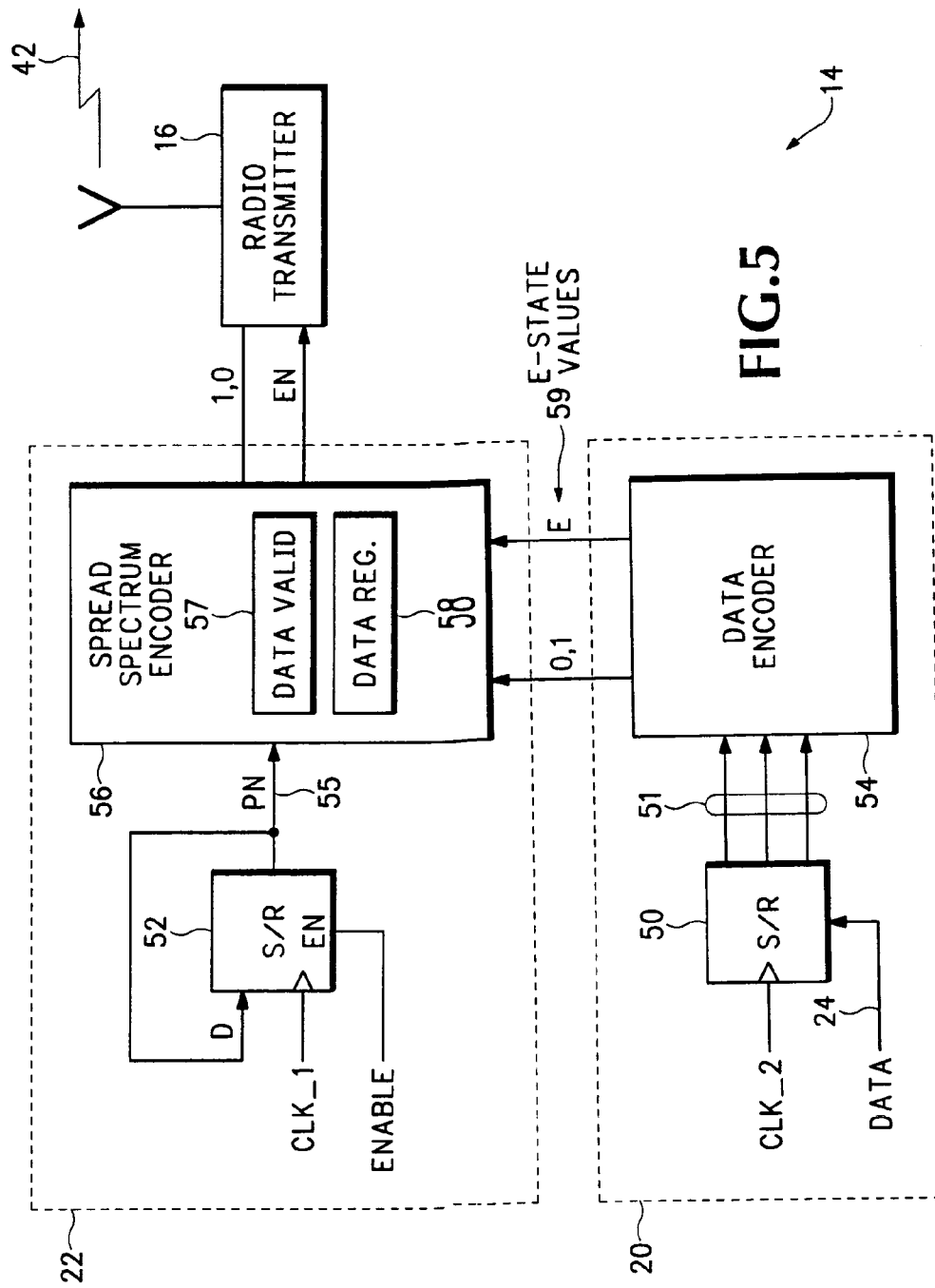
FIG. 5 is a detailed block diagram of a transmitting device shown in FIG. 5.

FIG. 5 shows the transmitting device 14 in more detail. The E-state data encoder 20 includes a shift register 50 that outputs sequences of bits 51 to a data encoder 54. The data encoder 54 in one example operates a table similar to table 1 or table 3 above that converts the groups of binary bits 51 into E-state values 59. For example, a sequence of three binary bits 51 may be output from shift register 50 and the data encoder 54 may then output two corresponding E-state values 59.

The E-state DSSS encoder 22 includes a shift register 52 that generates PN codes 55. A spread spectrum encoder 20 receives the PN codes 55 from shift register 52 and the E-state values 59 from the E-state data encoder 22. The encoder 56 encodes the logic 0 and logic 1 values from E-state values 59 into conventional PN encoded data. However, the E values from encoded data 59 are not encoded with PN codes 55. As described above, the E values in encoded data 59 cause the encoder 56 to disable the radio transmitter 16 or prevents the transmitter 16 from modulating any PN codes during the associated spread spectrum time slot.

The encoded E-state data may be sent to the radio transmitter circuitry 16 one byte at a time. An additional data valid byte may be generated by the encoding circuitry 54 or 56. The first byte may contain the actual E-state encoded data values and the second byte may be a bit mask defining which PN bit periods the radio 16 is suppose to transmit data. In one exemplary embodiment this feature may be used to facilitate transmission of partial bytes.

For example, a data register 58 in encoder 56 receives logic 0 and logic 1 values 59 output by data encoder 20. The contents in the data register 58 associated with E values is not set to any value and therefore has a "don't care" value. A data valid register 57 has bits associated with each value stored in data register 58. Any value 59 output by the data encoder 20 has a corresponding invalid bit set in data valid register 57. Any logic 0 or logic 1 values have an associated valid bit set in register 57.

In a traditional wireless spread spectrum implementation, firmware running on a Microcontroller (MCU) is connected to the radio transmitter 16 and may send a 24-byte data packet 275493 by loading 0b00100111 into the data register 58 and 0b11111111 into the data valid register 57, followed by 01010100 and 0b11111111, and then 0b10010011 and 0b11111111. This transmission would take 24 bit periods.

In the E-state encoding scheme using the same hardware as the traditional implementation, the same information is transmitted by loading the following sequence into the TX data register 58 and the data valid register 57.
TX Data Register 58: 0b0101X01X, and then 0b0X0X0X10 (Xs represent don't care) Data Valid Reg. 57: 0b11110110, and then 0b10110101011

As noted above, for bit periods corresponding to bit positions in the data valid register 57 containing a "1", the radio transmitter 16 transmits the contents of the TX data register 58. For bit periods corresponding to bit positions in the data valid register 57 containing a "0", the radio transmitter 16 will not modulate the carrier, or sends only a radio pre-amble.

Figure 6:
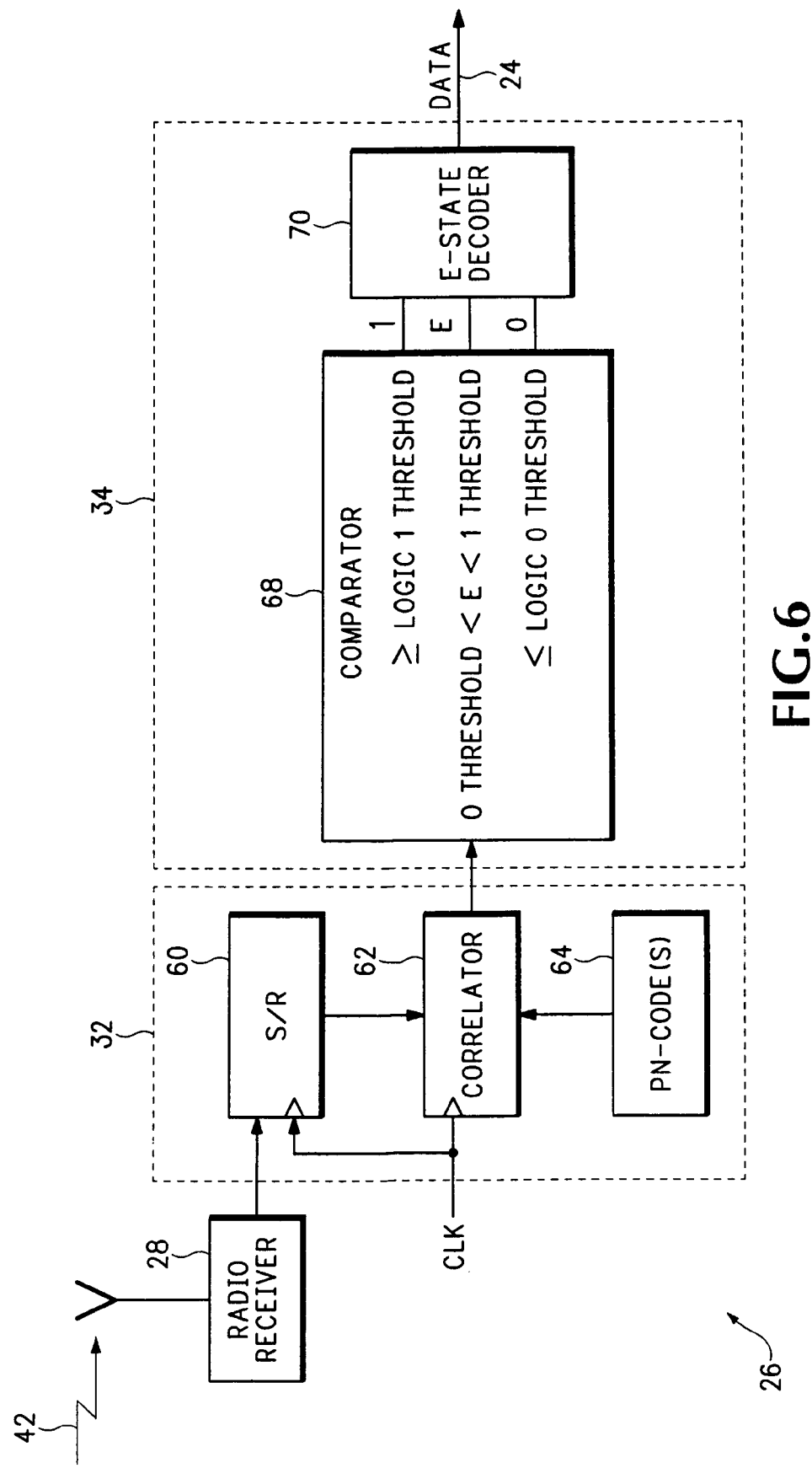
FIG. 6 is a detailed block diagram of a receiving device shown in FIG. 5.

FIG. 6 shows a more detailed diagram of the receiving device 26 previously shown in FIG. 4. The radio receiver 28 receives DSSS signals. The E-state DSSS correlator 32 includes a shift register 60 that captures samples of the DSSS signal and correlates the samples with the one or more PN codes 64 using a correlator 62. The output of the correlator 62 is a number of PN bit matches for the time slot in the DSSS signaling 42 that best correlates with the PN codes 64.

The E-state data decoder 34 then determines which of the E-state values correspond with the results of the correlation. In one example, when the predetermined number of PN chip matches is equal and/or above a first threshold value, the comparator 68 generates a logic 1 value. For example, for a 32 bit PN code, more than say 28 bit matches may be configured to correspond to a logic 1 value. Similarly, less than some minimum threshold number of PN chip matches may be configured to correspond to a logic 0 value. For example, if less than 4 PN chips match the PN code 64 in a DSSS signal time slot, the comparator generates a logic 0 value.

Any time slots that have less PN chip matches than the upper threshold for the logic 1 value but more PN chip matches than the lower threshold for the logic 0 value are identified as an E logic value. An E-state decoder 70 than converts a sequence of E-state values back into their binary equivalent 24. For example, the decoder 70 conducts the reverse translation that is described in tables 1 and 3.

The E-state encoding scheme has many advantages, including but not limited to, increasing throughput in existing DSSS radio Integrated Circuits (ICs). The E-state encoding scheme allows wireless devices to implement applications which otherwise could not be implemented. For example, by improving signal quality and by reducing power consumption in wireless applications.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A wireless communication device, comprising:
    an encoder configured to combine Pseudo-Noise (PN) coded and non-PN coded data values into a same packet;
    a transmitter configured to wirelessly transmit the packet containing the combined PN coded data values and non-PN coded values;
    a first register configured to store a first set of PN encoded data values and a second set of non-PN encoded data values; and
    a second register configured to identify the PN encoded data values and non-PN encoded data values.

2. The wireless communication device according to claim 1 wherein the encoder enables a PN encoder during PN coded transmission periods and disables the PN encoder during non-PN coded transmission periods.

3. The wireless communication device according to claim 1 wherein the encoder further comprises:
    a first stage configured to encode a first set of binary data bits into the first set of PN encoded data values in the packet; and
    a second state configured to combine the second set of non-PN encoded data values with the first set of PN encoded data values in the same packet.

4. The wireless communication device according to claim 3 wherein the transmitter is prevented from transmitting PN codes during time periods associated with the second set of non-PN encoded data values.

5. The wireless communication device according to claim 3 wherein the first and second stage of the encoder attach the PN encoded data values and non-PN encoded data values back to back wherein the second set of non-PN encoded data values are sandwiched between the first set of PN encoded data values and a third set of PN-encoded data values.

6. The wireless communication device according to claim 1 wherein the transmitter is a Direct Sequence Spread Spectrum (DSSS) transmitter that transmits spread spectrum signals that contain the PN encoded data values.

7. The wireless communication device according to claim 1 including:
    a first serial register configured to generate PN codes;
    a second serial register configured to select groups of data bits for PN encoding; and
    a spread spectrum encoder that encodes the selected groups of data bits with the PN codes and does not encode other non-selected data bits with the PN codes.

8. An apparatus, comprising:
    a correlator identifying Pseudo Noise (PN) encoded portions and non-PN encoded portions of a received packet;
    a first decoder configured to convert each of the PN encoded portions of the packet into a first set of decoded data values corresponding with PN codes, and treat each of the non-PN encoded portions of the packet as an additional second set of data values that are not PN encoded;
    a second decoder configured to convert a sequence of the first set of decoded data values corresponding with the PN codes and the second set of decoded data values not corresponding with the non-PN codes into the same packet radio circuitry configured to receive spread spectrum signals that include the PN encoded portions of the packet; and
    wherein the first decoder identifies the PN-encoded portions of the packet when the spread spectrum signal is within a first upper threshold number of matching PN chips, and identifies the non-PN encoded portions of the packet when the spread spectrum signal is not within the first upper threshold number of matching PN chips.

9. The apparatus according to claim 8 wherein the second decoder formats the first set of decoded data values and the second set of data values into a sequence of binary bit values for the same packet.

10. The apparatus according to claim 8 wherein the receiver is a Universal Serial Bus (USB) device that converts at least a portion of the received data packet into USB signals.

11. A method of transmitting data, comprising:
encoding a first set of data values into Pseudo-Noise (PN) encoded data values;
combining the first set of PN encoded data values with a second set of data values that are not PN encoded into a same packet;
storing in a first register the first set of PN encoded data values and the second set of data values that are not PN encoded;
identifying with a second register the first set of PN encoded data values and the second set of data values that are not PN encoded; and
transmitting the packet that includes the first set of PN encoded data values and the second set of data values that are not PN encoded.

12. The method according to claim 11 including disabling a PN transmission during periods when the second set of data values are being transmitted.

13. The method according to claim 11 including encoding the first set of PN encoded data values back to back with the second set of data values.

14. The method according to claim 11 including sandwiching the second set of non-PN encoded data values between the first set of PN encoded data values and a third set of PN encoded data values.

15. The method according to claim 11 including:
receiving a sequence of binary data bits;
encoding a first set of the binary data bits with PN codes and transmitting the first set of PN encoded binary data bits;
not encoding the PN codes with a second set of binary data bits and transmitting the second set of binary data bits immediately after transmitting the first set of PN encoded binary data bits.

\* \* \* \* \*